US008750520B2

(12) United States Patent
Sniffen et al.

(10) Patent No.: US 8,750,520 B2
(45) Date of Patent: Jun. 10, 2014

(54) APPRAISING SYSTEMS WITH ZERO KNOWLEDGE PROOFS

(75) Inventors: Brian T. Sniffen, Cambridge, MA (US); Joshua Guttman, Newton Centre, MA (US); Ariel Segall, Arlington, MA (US); Amy L. Herzog, Pebble Beach, CA (US)

(73) Assignee: The MITRE Corporation, McLean, VA (US)

( * ) Notice: Subject to any disclaimer, the term of this patent is extended or adjusted under 35 U.S.C. 154(b) by 38 days.

(21) Appl. No.: 13/298,465

(22) Filed: Nov. 17, 2011

(65) Prior Publication Data

US 2012/0063600 A1    Mar. 15, 2012

Related U.S. Application Data

(62) Division of application No. 12/173,229, filed on Jul. 15, 2008.

(51) Int. Cl.
*H04L 9/00* (2006.01)
*H04L 9/32* (2006.01)

(52) U.S. Cl.
CPC ............... *H04L 9/3221* (2013.01); *H04L 9/32* (2013.01)
USPC ..................... 380/277; 380/44; 726/4; 726/9

(58) Field of Classification Search
CPC ............................. H04L 9/3221; H04L 9/32
USPC ..................................... 380/277, 44; 726/4, 9
See application file for complete search history.

(56) References Cited

U.S. PATENT DOCUMENTS

| 4,926,479 | A  | * | 5/1990  | Goldwasser et al. | ......... 713/180 |
| 6,962,530 | B2 | * | 11/2005 | Jackson           | ........... 463/29 |
| 7,437,718 | B2 | * | 10/2008 | Fournet et al.    | ........ 717/133 |
| 7,454,782 | B2 | * | 11/2008 | Rajasekaran et al.| ........... 726/4 |
| 7,853,018 | B2 | * | 12/2010 | Atallah et al.    | ........ 380/277 |
| 7,933,915 | B2 | * | 4/2011  | Singh et al.      | ........ 707/760 |
| 8,422,683 | B2 |   | 4/2013  | Sniffen et al.    |                  |
| 2005/0132202 | A1 | * | 6/2005 | Dillaway et al. | ........ 713/179 |
| 2007/0127721 | A1 | * | 6/2007 | Atallah et al.  | ........ 380/277 |
| 2008/0015808 | A1 | * | 1/2008 | Wilson et al.   | ........ 702/123 |
| 2008/0151926 | A1 | * | 6/2008 | Mosko et al.    | ........ 370/447 |
| 2008/0256595 | A1 | * | 10/2008 | Schunter et al. | ............ 726/1 |
| 2008/0320308 | A1 | * | 12/2008 | Kostiainen et al. | ....... 713/171 |
| 2009/0049300 | A1 | * | 2/2009 | Camenisch       | ........ 713/176 |
| 2009/0217368 | A1 | * | 8/2009 | Buss et al.     | ............ 726/9 |
| 2009/0287926 | A1 | * | 11/2009 | Furukawa        | ........ 713/168 |
| 2009/0300348 | A1 |   | 12/2009 | Aciicmez et al. |                  |
| 2010/0031047 | A1 | * | 2/2010 | Coker et al.    | ........ 713/176 |
| 2010/0290618 | A1 |   | 11/2010 | Slawomir et al. |                  |

OTHER PUBLICATIONS

Dima Grigoriev et al. "Zero-Knowledge Authentication Schemes From Actions on Graphs, Groups, or Rings." Pub. Date: Feb. 12, 2008.*

* cited by examiner

*Primary Examiner* — Azizul Choudhury
*Assistant Examiner* — James Forman
(74) *Attorney, Agent, or Firm* — Sterne, Kessler, Goldstein & Fox PLLC

(57) ABSTRACT

A system, method, and computer program product are provided for requesting a proof of a security policy in a client system. Additionally, a system, method, and computer program product are provided for proving a security policy to an interrogator system.

15 Claims, 9 Drawing Sheets

APPRAISING SYSTEMS WITH ZERO KNOWLEDGE PROOFS

CROSS-REFERENCE TO RELATED APPLICATIONS

This application is a divisional of U.S. patent application Ser. No. 12/173, 229, filed Jul. 15, 2008, which is incorporated herein by reference in its entirety.

STATEMENT UNDER MPEP 310

The U.S. Government has a paid-up license in this invention and the right in limited circumstances to require the patent owner to license others on reasonable terms as provided for by the terms of CECOM contract W15P7T-04-C-D199 awarded by the National Security Agency.

BACKGROUND OF INVENTION

1. Field of the Invention

The present invention relates generally to network security and, more particularly, to attestation of properties of a remote system.

2. Description of the Background Art

A major problem faced when devising a secure communications system is determining whether an untrusted system should be trusted. Additionally, if the untrusted system simply sends information that can be reliably used to determine the untrusted system's trustworthiness, the recipient of this information, including any intermediary systems listening to the communications system, could use this information to impersonate the untrusted system.

Accordingly, what is desired is a means by which the untrusted system can attest to particular characteristics while providing a potential attacker zero reusable knowledge.

SUMMARY OF INVENTION

The invention includes a method for requesting a proof of a security policy in a client system. The method includes the steps of sending a query to the client system, receiving attestation data from the client system responsive to the query, wherein the attestation data comprises an encrypted graph, and requesting encryption keys for either the entire graph, or for edges of the graph that demonstrate a property of the graph.

The invention also includes a computer program product comprising a computer usable medium having computer program logic recorded thereon for enabling a processor to request a proof of a security policy in a client system. The computer program logic includes sending means for enabling a processor to send a query to the client system, receiving means for enabling a processor to receive attestation data from the client system responsive to the query, wherein the attestation data comprises an encrypted graph, and requesting means for enabling a processor to request encryption keys for either the entire graph, or for edges of the graph that demonstrate a property of the graph.

The invention additionally includes a system capable of requesting a proof of a security policy in a client system. The system includes a first module to send a query to the client system, a second module to receive attestation data from the client system responsive to the query, wherein the attestation data comprises an encrypted graph, and a third module to request encryption keys for either the entire graph, or for edges of the graph that demonstrate a property of the graph.

The invention furthermore includes a method for proving a security policy to an interrogator system. The method includes the steps of receiving a query, generating a graph based on results of the query, encrypting edges of the graph, transmitting the encrypted graph to the interrogator system, and receiving a request for encryption keys, the request selected from either a request for encryption keys for the graph, or a request for encryption keys for some property of the graph, wherein the requested keys are sent to the interrogator system.

Moreover, the invention includes a computer program product comprising a computer usable medium having computer program logic recorded thereon for enabling a processor to prove a security policy to an interrogator system. The computer program logic includes first receiving means for enabling a processor to receive a query, generating means for enabling a processor to generate a graph based on results of the query, encrypting means for enabling a processor to encrypt edges of the graph, transmitting means for enabling a processor to transmit the encrypted graph to the interrogator system, and second receiving means for enabling a processor to receive a request for encryption keys, the request selected from either a request for encryption keys for the graph, or a request for encryption keys for some property of the graph, wherein the requested keys are sent to the interrogator system.

Also included in the invention is a system capable of proving a security policy to an interrogator system. The system includes a first module to receive a query, a second module to generate a graph based on results of the query, a third module to encrypt edges of the graph, a fourth module to transmit the encrypted graph to the interrogator system, and a fifth module to receive a request for encryption keys, the request selected from either a request for encryption keys for the graph, or a request for encryption keys for some property of the graph, wherein the requested keys are sent to the interrogator system.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the relevant art to make and use the invention.

Figure 1:
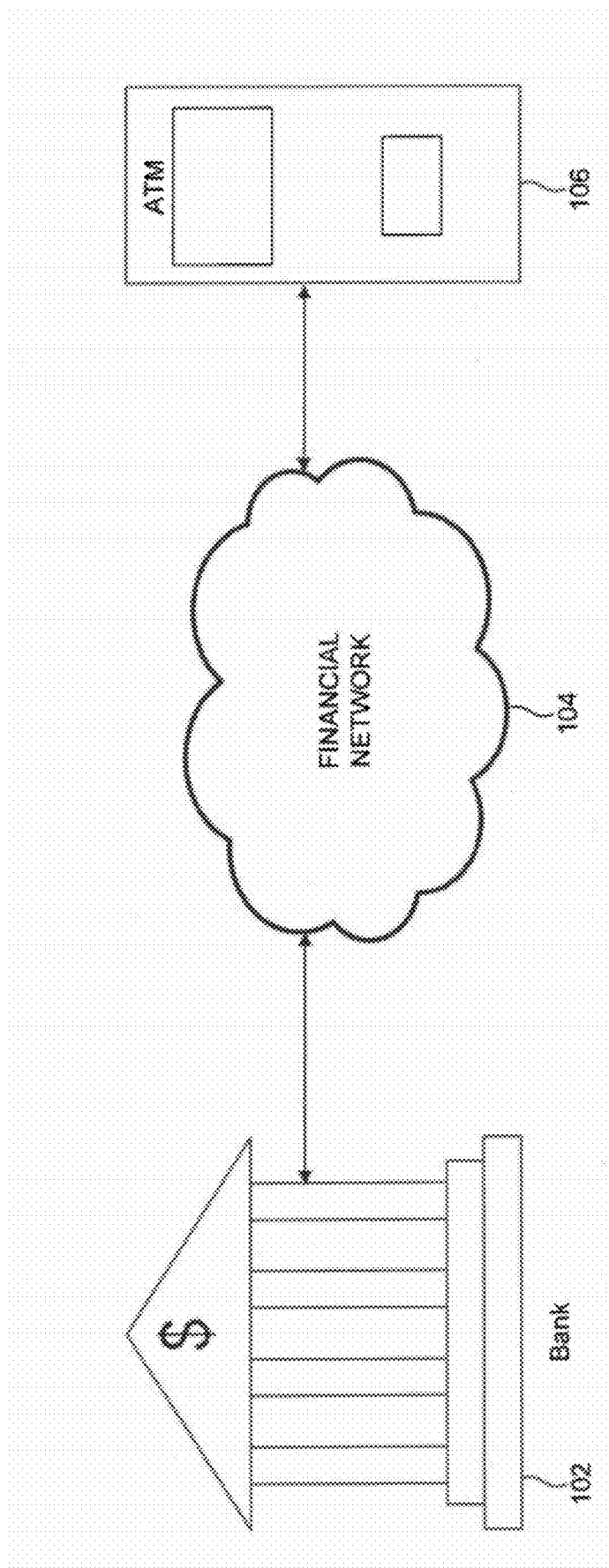
FIG. 1 illustrates an exemplary financial network on which the present invention may be implemented, in accordance with an embodiment of the present invention.

The present invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

I. Introduction

FIG. 1 is a financial system 100 illustrating an exemplary situation in which a secure means of proving information about a system is employed. In the example, a financial institution, such as bank 102, communicates with an Automated Teller Machine (ATM) 106 over financial network 104. ATM 106 may not belong to bank 102, or bank 102 may for any other reason not trust ATM 106. Accordingly, bank 102 would request some assurance, or attestation, of the security policies of ATM 106 before initiating sensitive communications, in accordance with an embodiment of the present invention.

This attestation includes, in accordance with an additional embodiment of the present invention, attestation regarding individual components, both hardware and software, within ATM 106.

Figure 2:
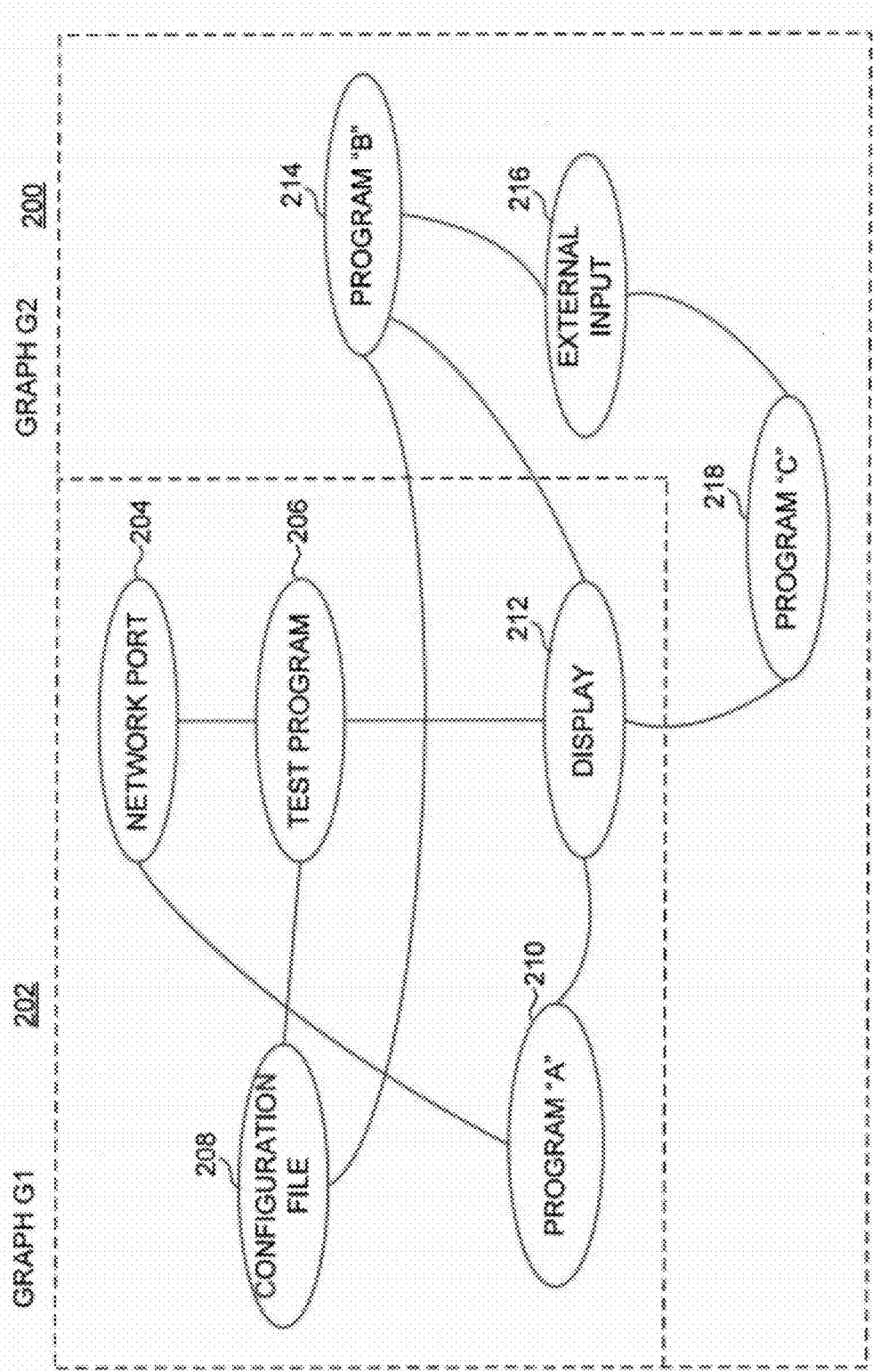
FIG. 2 illustrates a graph of a test platform, in accordance with an embodiment of the present invention.

With continued reference to FIG. 1, FIG. 2 is a graph, G2 200, which represents a permutation of a "prover" system, such as ATM 106, in accordance with an embodiment of the present invention. For example, graph G2 200 has several nodes representing the hardware and software configuration of the prover system, and the nodes are connected to other nodes with which they communicate. The prover system, or test platform, is operable to prove some property of itself to a "verifier" system, such as bank 102. In FIG. 2, the property to be proven is shown as graph G1 202, which is a subgraph of G2 200. In accordance with an additional embodiment of the present invention, G1 202 is isomorphic to a subgraph of G2 200.

Both the prover and the verifier systems know the property to be proven, which in the above example corresponds to graph G1 202. In this example, the verifier wants to ascertain that the prover is running a system which has nodes 204, 206, 208, 210, and 212 interconnected in the manner shown in FIG. 2. In accordance with an embodiment of the present invention, the presence of the nodes and appropriate interconnections would mean that the prover is running a particular security policy.

Figure 3:
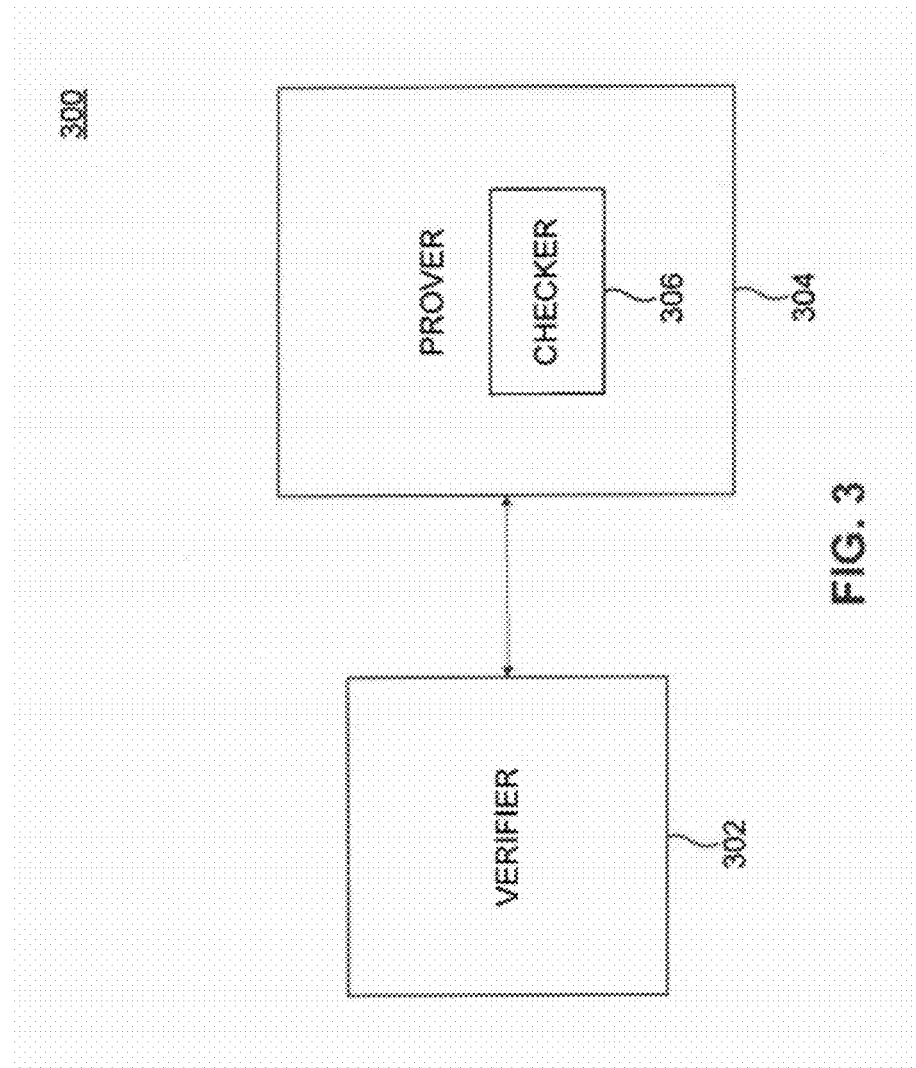
FIG. 3 illustrates an attestation system, in accordance with an embodiment of the present invention.

FIG. 3 is an attestation system 300 where a verifier 302 is operable to make some determination regarding whether to trust prover 304. In order to accomplish this, prover 304 runs a checker 306, in accordance with an embodiment of the present invention. Checker 306 is operable to determine system information regarding prover 304 and to transmit that information to verifier 302. In accordance with an embodiment of the present invention, checker 306 is operable to determine a security policy of prover 304.

In accordance with an additional embodiment of the present invention, checker 306 is provided to prover 304 by an adversary (e.g., verifier 302). In an embodiment, checker 306 is installed on prover 304 prior to the initiation of any communications with verifier 302. In accordance with an additional embodiment of the present invention, verifier 302 provides checker 306 to prover 304 upon initiating communications.

Figure 4:
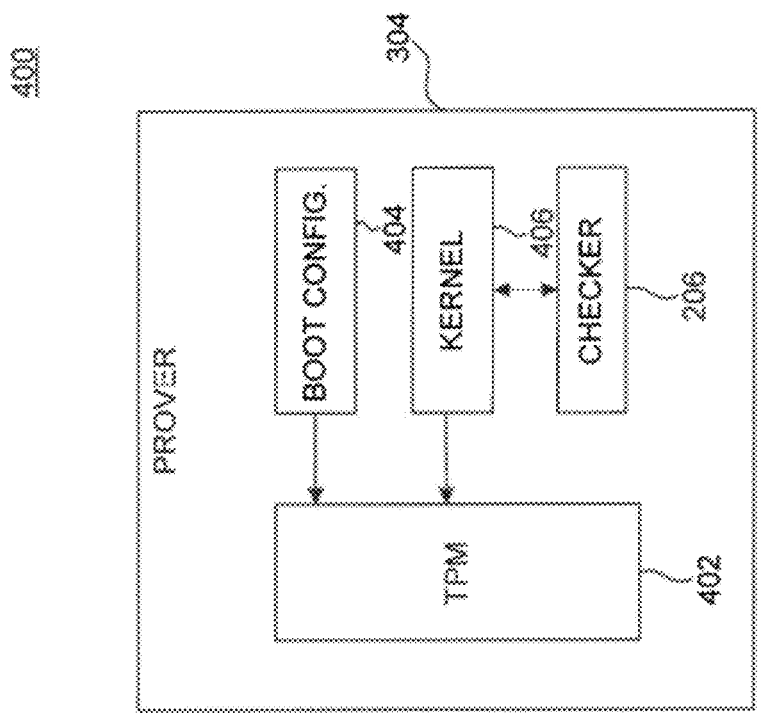
FIG. 4 illustrates a test platform, in accordance with an embodiment of the present invention.

FIG. 4 is a security system 400 of prover 304. In accordance with an embodiment of the present invention, prover 304 utilizes a Trusted Platform Module (TPM) 402 to generate hash values of various system components. For example, TPM 402 is operable to create a hash corresponding to a boot configuration 404 of prover 304, as well as a particular kernel 406 installed on prover 304. In accordance with an embodiment of the present invention, kernel 406 is operable to verify checker 306 and transmit its hash value information to TPM 402. By comparing these hash values to known, expected values, a verifier can determine whether checker 306 itself is trusted, as well as any layers below it. One skilled in the relevant arts will appreciate that several layers of trust based on these hashes can be established, and the components shown in security system 400 are detailed by way of example, and not limitation.

II. Challenging a Test Platform

With continued reference to FIGS. 2 and 3, verifier 302 wishes to ascertain some feature of prover 304. In accordance with an embodiment of the present invention, the feature is that prover 304 is implementing a particular security policy. One skilled in the relevant arts will appreciate that any data set that may be represented graphically (using any graphical technique) could be used as the feature needed to be ascertained.

Figure 5:
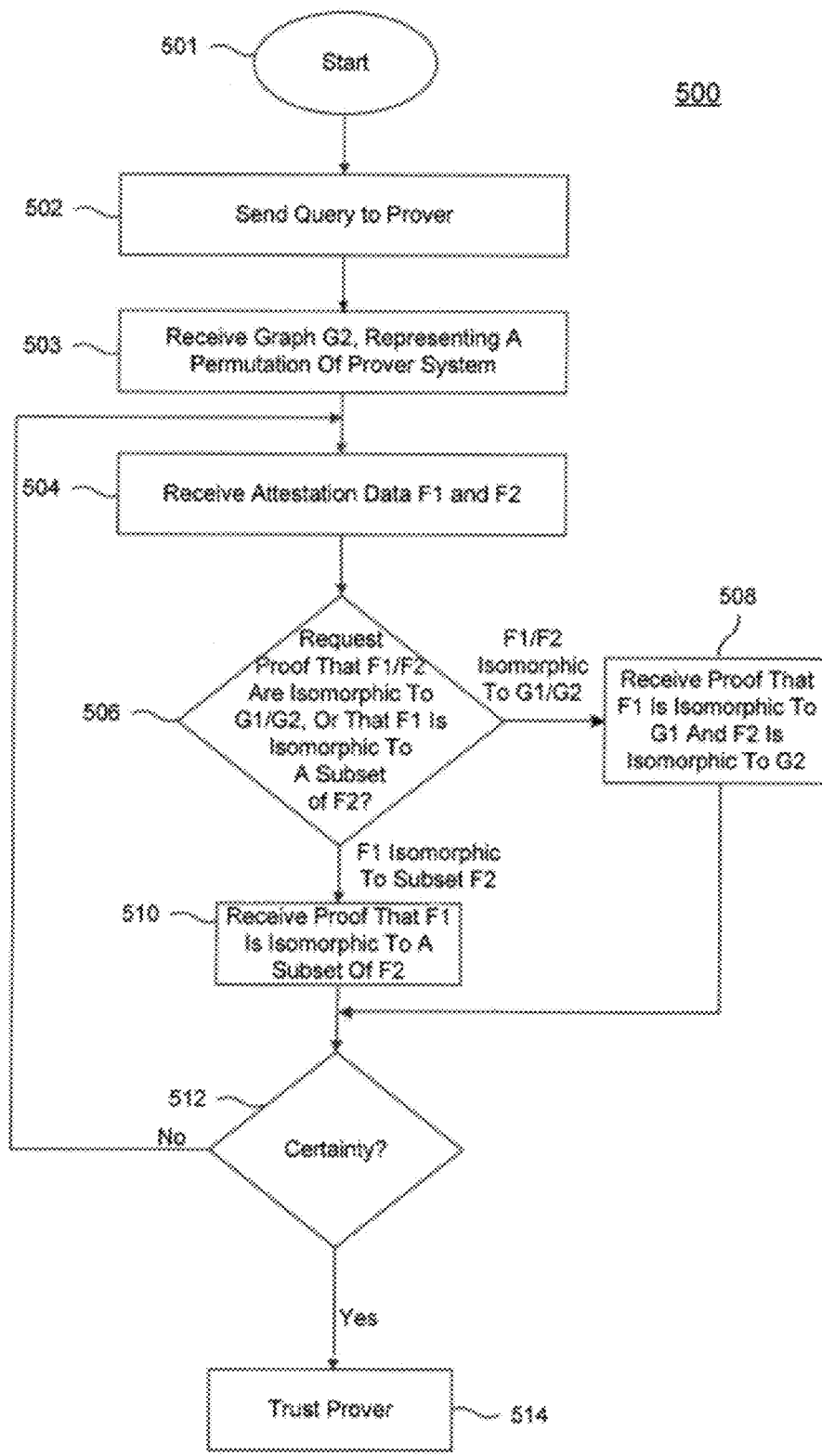
FIG. 5 is a flowchart illustrating steps by which a verifier system processes attestation information from a prover system, in accordance with an embodiment of the present invention.

FIG. 5 is a flowchart 500 illustrating steps by which verifier 302 is operable to challenge prover 304 to prove the relevant feature. The method begins at step 501 and proceeds to step 502 where a query is sent to the prover. The verifier receives a graph, for example graph G2, at step 503 which represents a permutation of the prover system, in accordance with an embodiment of the present invention. At step 504, the verifier receives attestation data. This attestation data includes graphs corresponding to the feature under test. In accordance with an embodiment of the present invention, these graphs are graph F1, which is a permutation of a graph of the property to be proven, such as graph G1 202 of FIG. 2, and graph F2, which is a permutation of the graph representing a permutation of the prover system, such as graph G2 200 of FIG. 2.

In accordance with an embodiment of the present invention, the query of step 502 is a request for proof of a particular security configuration. The verifier knows the resulting graph that it expects (i.e., the particular security configuration which it trusts).

If an attacker receives either of the communications from steps 502, 503, or 504, the information is insufficient for the attacker to later assume the identity of either the verifier 302 or the prover 304. The query at step 502 reveals no information about the graph verifier 302 expects from the test platform.

In accordance with an embodiment of the present invention, the prover is trusted if it can show that graph G1, which is an N-node graph which describes a policy, is isomorphic to a subgraph of graph G2, which is an M-node graph (where M is greater-than-or-equal-to N) that represents a permutation of the prover system. In an embodiment, this is shown by the prover generating the graph F1, which is a permutation of graph G1, and the graph F2, which is a permutation of graph G2, and successfully proving that F1 and F2 are isomorphic to G1 and G2, as well as that F1 is isomorphic to a subgraph of F2.

Accordingly, at step 506, verifier 302 requests either one of the two aforementioned proofs, in accordance with an embodiment of the present invention. Specifically, in an embodiment, the verifier requests that the prover successfully prove either that F1 and F2 are isomorphic to G1 and G2, respectively, or that F1 is isomorphic to a subgraph of F2. In an embodiment, the selection of which proof to request occurs randomly. It should be noted that graphs G1, G2, F1, and F2 are already known to the verifier 302 at this point, and cannot be changed by prover 304 in order to falsify the answer. At step 508, the verifier 302 receives proof that F1 is isomorphic to G1 and that F2 is isomorphic to G2, or, alternatively, at step 510 receives proof that F1 is isomorphic to a subgraph of F2, depending on the selected proof.

Assuming that prover 304 has been somehow compromised, an attacker mimicking prover 304 up to this point has a 50% probability of "fooling" the verifier 302. Verifier 302 knows what graph it expects in response to its query of step 502, and receives graphs at step 504. If the attacker knows G1 and G2, the attacker may potentially generate graphs F1 and F2 such that F1 is isomorphic to G1 and F2 is isomorphic to G2, in which case it would not likely know the associated property (and would not be able to derive it on-the-fly if the property is a solution to an NP-complete problem). If the attacker knows a proof that F1 is isomorphic to G1 and that F2 is isomorphic to G2, then the attack succeeds if the verifier 302 requests such proof at step 506, but fails if the verifier requests proof that F1 is isomorphic to a subgraph of F2, as computing such a proof is an NP-complete problem.

On the other hand, the attacker may know a set of graphs for which the desired property applies (usually, for an NP-complete problem, by virtue of creating the graph specifically so that it has the desired property). In the aforementioned example, the attacker may generate F1 and F2 such that F1 is isomorphic to a subgraph of F2. However, these graphs would not be themselves isomorphic to G1 and G2, because computing the graphs in this manner would be an NP-complete problem. In this case, the attacker wins if the verifier 302 requests proof that F1 is isomorphic to a subgraph of F2, but fails if the verifier requests proof that F1 is isomorphic to G1 and that F2 is isomorphic to G2. In both cases, the attacker has a 50% probability of success.

In accordance with an embodiment of the present invention, verifier 302 improves the certainty of the prover's 304 proof by repeating steps 504, 506, and 508/510 as appropriate. Step 512 determines whether the verifier's 302 certainty threshold has been met. If it has, then the prover is trusted at step 514, otherwise the process repeats. It should be noted that the attacker's 50% chance of success with each iteration is a maximum, as it requires the attacker to act truthfully regarding the requested proofs, and cannot simply refuse to engage with the security protocol. Each successive iteration of the process reduces the probability in half that the attacker will evade detection by the process. When a prover's probability of falsifying proofs has diminished beyond the verifier's threshold, the system is trusted.

III. Answering the Verifier's Challenge

Figure 6:
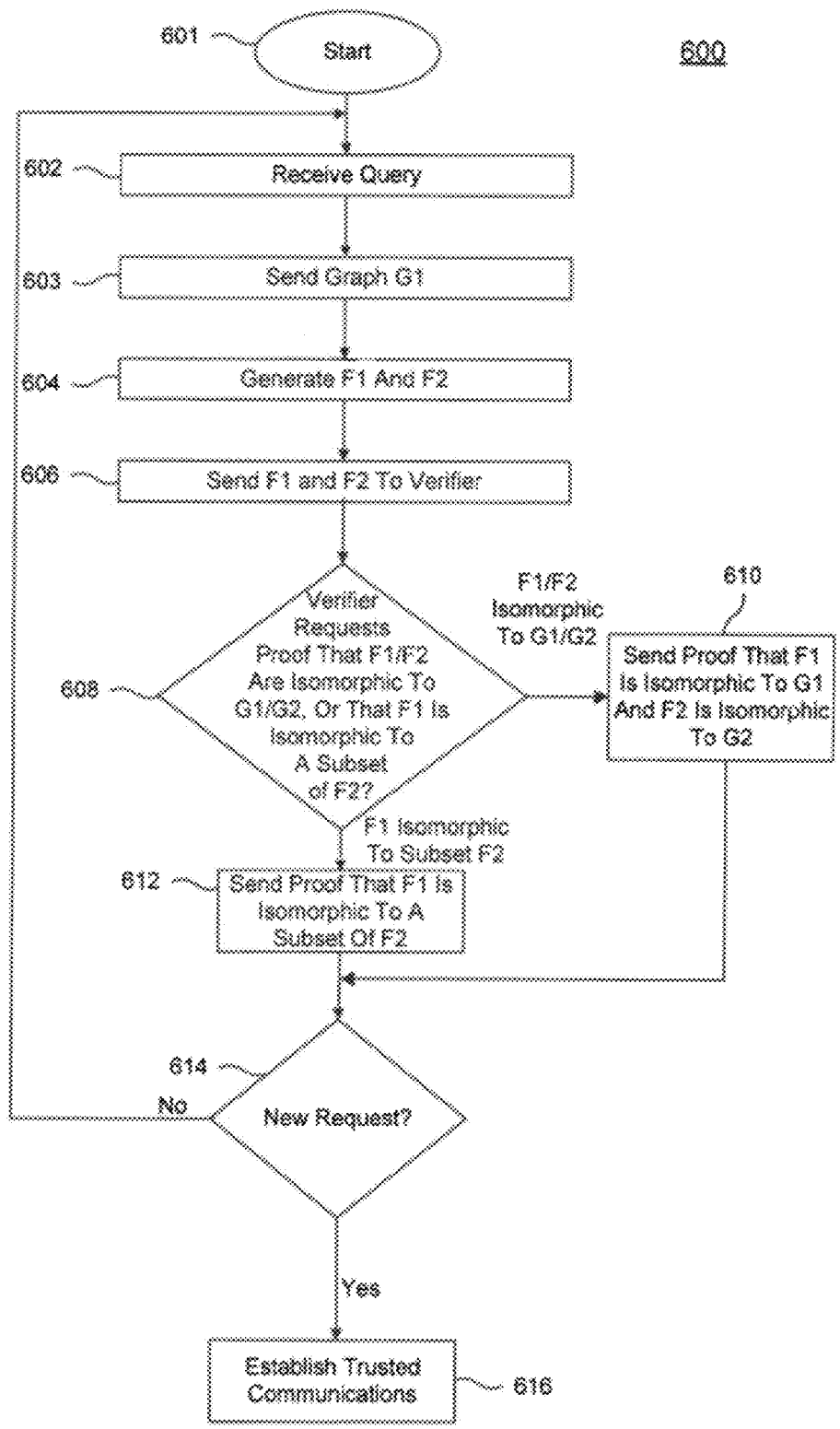
FIG. 6 is a flowchart illustrating steps by which a prover system provides attestation information to a verifier system, in accordance with an embodiment of the present invention.

FIG. 6 is a flowchart 600 illustrating the steps by which a prover, such as prover 304, is operable to respond to the challenges of a verifier, such as verifier 302. Flowchart 600 complements flowchart 500 of FIG. 5 by illustrating the points at which the prover sends information to the verifier for its use in flowchart 500.

The method begins at step 601 and proceeds to step 602 where the prover receives a query, such as the aforementioned query sent by the verifier in step 502. At step 604, the prover determines the results of the query and generates a graph of the results, such as graphs F1 and F2 discussed in Section II, in accordance with an embodiment of the present invention. At step 606, the prover sends the graphs to the verifier.

At step 608, the prover receives a request for a proof from the verifier. One of two proofs is requested: either a proof that F1 and F2 are isomorphic to G1 and G2, respectively, or that F1 is isomorphic to a subgraph of F2. Specifically, the two proofs call for a property associated with the solution to an NP-complete problem of the graph, in accordance with an embodiment of the present invention. If proof that F1 and F2 are isomorphic to G1 and G2, respectively, is requested, then the proof is provided at step 610. If proof that F1 is isomorphic to a subgraph of F2 is requested, then that proof is provided at step 612.

As noted in flowchart 500, verifier 302 is operable to determine how many times to iterate through this attestation process in order to reach a required degree of certainty regarding the attestation made by prover 304. Accordingly, at step 614, it is determined whether the verifier 302 is engaging in a new iteration of the attestation process. If so, the method returns to step 602, otherwise, the method continues to step 616 where trusted communications can begin.

IV. Graphing System Properties

Figure 7:
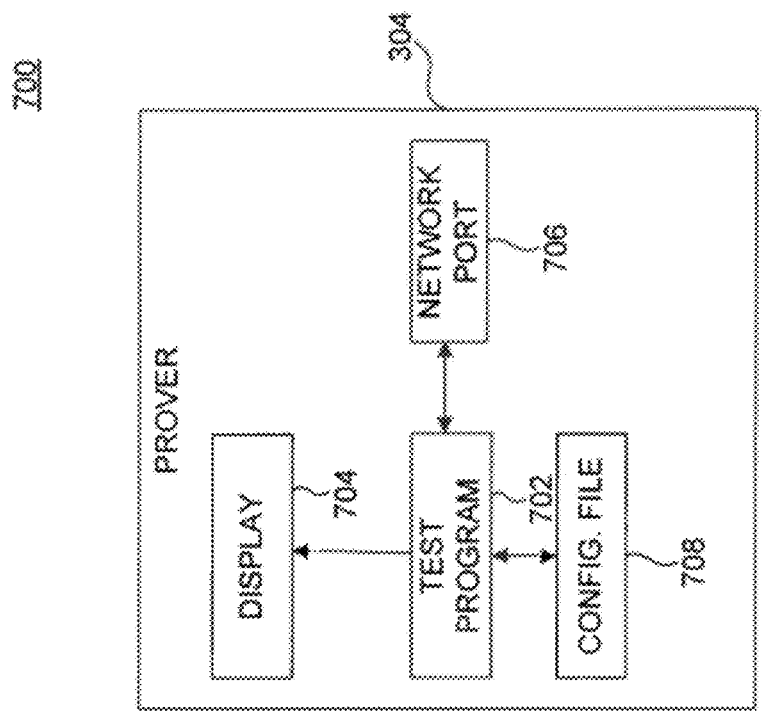
FIG. 7 illustrates a security policy of a prover, in accordance with an embodiment of the present invention.

FIG. 7 illustrates the security properties 700 of prover 304, in accordance with an embodiment of the present invention. In this example, a test program 702 has certain access to aspects of the system. For example, test program 702 may write data to display 704 for display on a computer monitor. Test program 702 may also receive and transmit data over a network port 706. Additionally, test program 702 may read from and write to its own configuration file 708.

Figure 8:
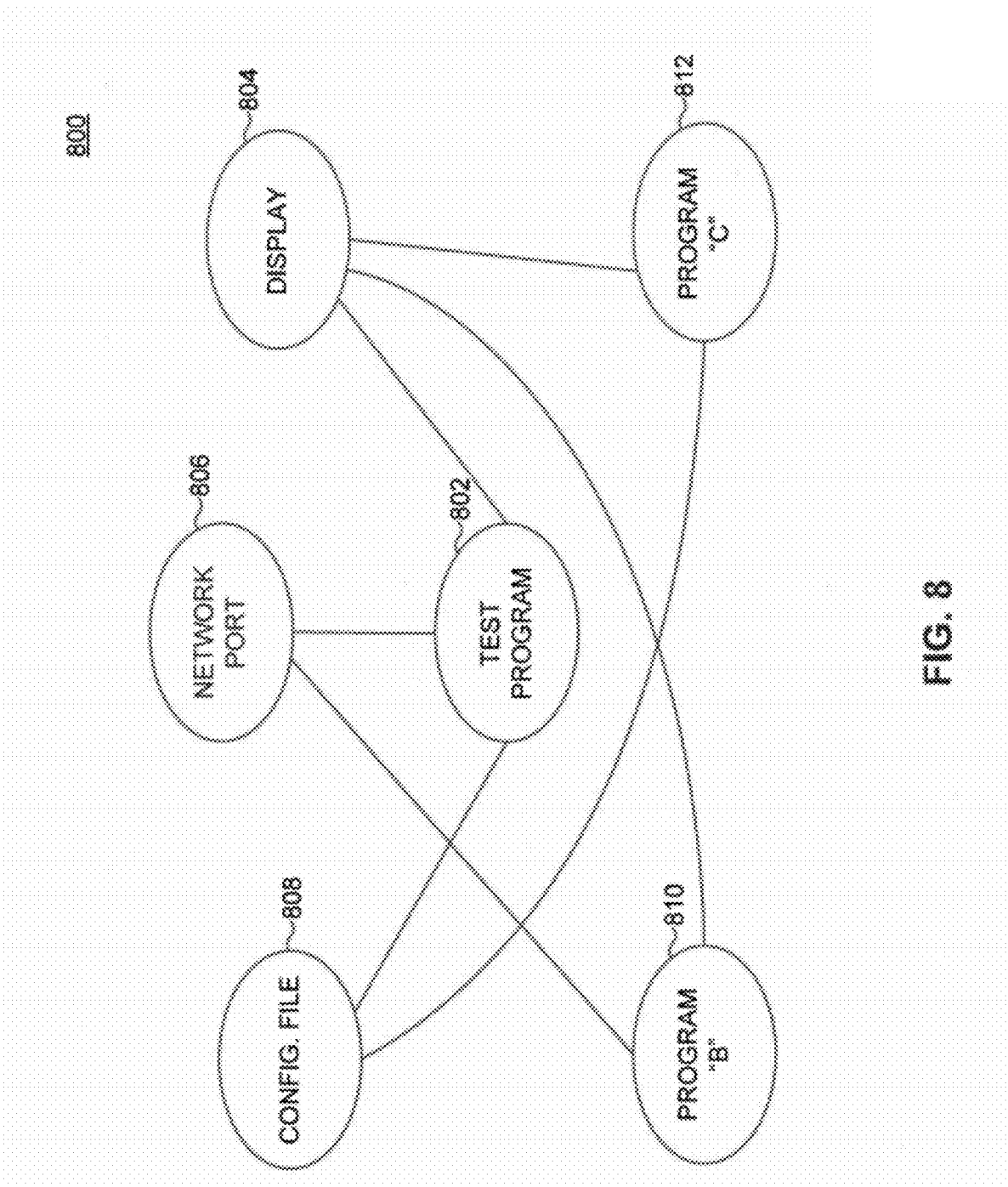
FIG. 8 illustrates a graph of a security policy of a test platform, in accordance with an embodiment of the present invention.

FIG. 8 illustrates a graph 800 derived from the aforementioned information, in accordance with an embodiment of the present invention. Additionally, two programs, "B" and "C", have been added to the graph as an example. As before, this graph shows that there is some connection between test program 802 and display 804, network port 806, and a configuration file 808. Program "B" 810 has some connection to network port 806 and display 804, but not to configuration file 808 (nor to test program 802 or program "C" 812). Program "C" has some connection to configuration file 808 and display 804.

One skilled in the relevant arts will appreciate that similar properties to those shown in FIG. 7 and FIG. 8 can be utilized to create a significantly more complex graph, with many vertices and edges. In such a case, determining the solution to an NP-complete problem (e.g., finding a sub-graph isomorphism becomes increasingly complicated and computationally intensive.

Turning back to flowchart 600 of FIG. 6, at step 604 a graph, such as graph 800, is generated in response to the query of step 602. At this stage, a legitimate interrogator knows graph 800, and the legitimate test platform knows graph 800 as well as some property of it, such as a Hamiltonian cycle. At step 606, each of the vertices of graph 800 (i.e., the vertices associated with elements 802, 804, 806, 808, 810, and 812) would be "shuffled" by selecting a random number to represent each, and the edges between the vertices is represented as a pair of these numbers, in accordance with an embodiment of the present invention. The method continues as detailed above in Section III.

V. Example Computer System Implementation

Figure 9:
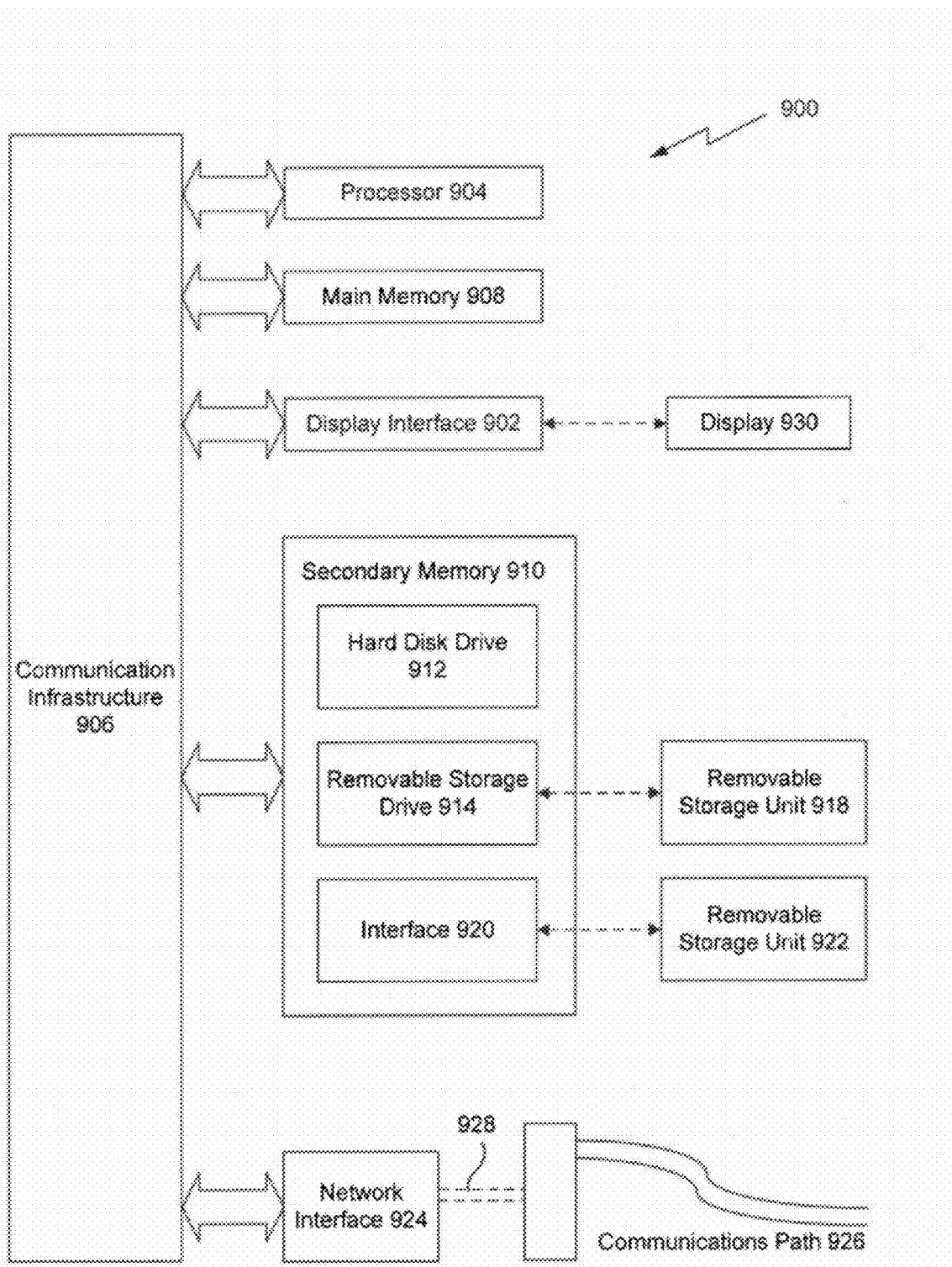
FIG. 9 depicts an example computer system in which the present invention may be implemented.

Various aspects of the present invention can be implemented by software, firmware, hardware, or a combination thereof. FIG. 9 illustrates an example computer system 900 in which the present invention, or portions thereof, can be implemented as computer-readable code. For example, the methods illustrated by flowcharts 500 of FIG. 5 and 600 of FIG. 6 can be implemented in system 900. Various embodiments of the invention are described in terms of this example computer system 900. After reading this description, it will become apparent to a person skilled in the relevant art how to implement the invention using other computer systems and/or computer architectures.

Computer system 900 includes one or more processors, such as processor 904. Processor 904 can be a special purpose or a general purpose processor. Processor 904 is connected to a communication infrastructure 906 (for example, a bus or network).

Computer system 900 also includes a main memory 908, preferably random access memory (RAM), and may also include a secondary memory 910. Secondary memory 910 may include, for example, a hard disk drive 912, a removable storage drive 914, and/or a memory stick. Removable storage drive 914 may comprise a floppy disk drive, a magnetic tape drive, an optical disk drive, a flash memory, or the like. The removable storage drive 914 reads from and/or writes to a removable storage unit 918 in a well known manner. Removable storage unit 918 may comprise a floppy disk, magnetic tape, optical disk, etc. which is read by and written to by removable storage drive 914. As will be appreciated by persons skilled in the relevant art(s), removable storage unit 918 includes a computer usable storage medium having stored therein computer software and/or data.

In alternative implementations, secondary memory 910 may include other similar means for allowing computer programs or other instructions to be loaded into computer system 900. Such means may include, for example, a removable storage unit 922 and an interface 920. Examples of such means may include a program cartridge and cartridge interface (such as that found in video game devices), a removable memory chip (such as an EPROM, or PROM) and associated socket, and other removable storage units 922 and interfaces 920 which allow software and data to be transferred from the removable storage unit 922 to computer system 900.

Computer system 900 may also include a communications interface 924. Communications interface 924 allows software and data to be transferred between computer system 900 and external devices. Communications interface 924 may include a modem, a network interface (such as an Ethernet card), a communications port, a PCMCIA slot and card, or the like. Software and data transferred via communications interface 924 are in the form of signals which may be electronic, electromagnetic, optical, or other signals capable of being received by communications interface 924. These signals are provided to communications interface 924 via a communications path 926. Communications path 926 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 918, removable storage unit 922, and a hard disk installed in hard disk drive 912. Signals carried over communications path 926 can also embody the logic described herein. Computer program medium and computer usable medium can also refer to memories, such as main memory 908 and secondary memory 910, which can be memory semiconductors (e.g. DRAMs, etc.). These computer program products are means for providing software to computer system 900.

Computer programs (also called computer control logic) are stored in main memory 908 and/or secondary memory 910. Computer programs may also be received via communications interface 924. Such computer programs, when executed, enable computer system 900 to implement the present invention as discussed herein. In particular, the computer programs, when executed, enable processor 904 to implement the processes of the present invention, such as the steps in the methods illustrated by flowcharts 500 of FIG. 5 and 600 of FIG. 6 discussed above. Accordingly, such computer programs represent controllers of the computer system 900. Where the invention is implemented using software, the software may be stored in a computer program product and loaded into computer system 900 using removable storage drive 914, interface 920, hard drive 912 or communications interface 924.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

VI. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method for proving, by a prover system, a security policy to an interrogator system, wherein the security policy is described by a graph G1 of the prover system described by a graph G2, the method comprising:
   receiving a query from the interrogator system;
   generating attestation data based on results of the query, wherein the attestation data comprises graph F1 comprising a permutation of graph G1, and graph F2 comprising a permutation of graph G2, wherein G1 is a subgraph of G2;
   transmitting the attestation data to the interrogator system;
   encrypting the edges of graphs G1 and G2 by labeling each vertex of graphs G1 and G2 with random numbers, representing each edge as a pair of vertices, and encrypting each edge with a different encryption key;
   receiving a request from the interrogator system of a proof of a property between two or more of G1, G2, F1, and F2, wherein the proof is an NP-complete problem; and
   providing the proof of the property to the interrogator.

2. The method of claim 1, wherein the proof of the property between two or more of G1, G2, F1, and F2 is a Hamiltonian cycle of F1 and F2.

3. The method of claim 1, further comprising:
receiving an additional query to satisfy a security threshold; and
repeating the generating the attestation data and the transmitting the attestation data.

4. The method of claim 1, wherein receiving a request from the interrogator system of a proof of a property between two or more of G1, G2, F1, and F2 comprises receiving a random request of a proof from a set of proofs comprising:
proof that F1 and F2 are isomorphic to G1 and G2 respectively, and
proof that F1 is isomorphic to a subgraph of F2.

5. The method of claim 4, wherein providing proof of the property comprises providing proof that F1 and F2 are isomorphic to G1 and G2 respectively, comprising:
providing encryption keys for graphs F1 and F2.

6. A computer-readable storage device having computer program logic recorded thereon, execution of which, by a computing device, causes the computing device to perform operations for proving a security policy to an interrogator system, wherein the security policy is described by a graph G1 of a prover system described by a graph G2 the operations comprising:
receiving a query from the interrogator system;
generating attestation data based on results of the query, wherein the attestation data comprises graph F1 comprising a permutation of graph G1, and graph F2 comprising a permutation of graph G2, wherein G1 is a subgraph of G2;
transmitting the attestation data to the interrogator system;
encrypting the edges of graphs G1 and G2 by labeling each vertex of graphs G1 and G2 with random numbers, representing each edge as a pair of vertices, and encrypting each edge with a different encryption key;
receiving a request from the interrogator system of a proof of a property between two or more of G1, G2, F1, and F2, wherein the proof is an NP-complete problem; and
providing the proof of the property to the interrogator.

7. The computer-readable storage device of claim 6, wherein receiving a request from the interrogator system of a proof of a property between two or more of G1, G2, F1, and F2 comprises receiving a random request of a proof from a set of proofs comprising:
proof that F1 and F2 are isomorphic to G1 and G2 respectively, and
proof that F1 is isomorphic to a subgraph of F2.

8. The computer-readable storage device of claim 7, wherein providing proof of the property comprises providing proof that F1 and F2 are isomorphic to G1 and G2 respectively, comprising:
providing encryption keys for graphs F1 and F2.

9. The computer-readable storage device of claim 6, wherein the proof of the property between two or more of G1, G2, F1, and F2 is a Hamiltonian cycle of F1 and F2.

10. The computer-readable storage device of claim 6, the operations further comprising:
receiving an additional query to satisfy a security threshold; and
repeating the generating the attestation data and the transmitting the attestation data.

11. A system for proving a security policy to an interrogator system, wherein the security policy is described by a graph G1 of the prover system described by a graph G2, the system comprising:
a memory storing instructions comprising:
receiving a query from the interrogator system,
generating attestation data based on results of the query, wherein the attestation data comprises graph F1 comprising a permutation of graph G1, and graph F2 comprising a permutation of graph G2, wherein G1 is a subgraph of G2,
transmitting the attestation data to the interrogator system,
encrypting the edges of graphs G1 and G2 by labeling each vertex of graphs G1 and G2 with random numbers, representing each edge of the graph as a pair of vertices, and encrypting each edge with a different encryption key,
receiving a request from the interrogator system of a proof of a property between two or more of G1, G2, F1, and F2, wherein the proof is an NP-complete problem, and
providing the proof of the property to the interrogator; and
one or more processors processing the instructions.

12. The system of claim 11, wherein receiving a request from the interrogator system of a proof of a property between two or more of G1, G2, F1, and F2 comprises receiving a random request of a proof from a set of proofs comprising:
proof that F1 and F2 are isomorphic to G1 and G2 respectively, and
proof that F1 is isomorphic to a subgraph of F2.

13. The system of claim 12, wherein providing proof of the property comprises providing proof that F1 and F2 are isomorphic to G1 and G2 respectively, and providing encryption keys for graphs F1 and F2.

14. The system of claim 11, wherein the proof of the property between two or more of G1, G2, F1, and F2 is a Hamiltonian cycle of F1 and F2.

15. The system of claim 11, the instructions further comprising receiving an additional query to satisfy a security threshold, and wherein the one or more processors repeat processing of the generating and the transmitting instructions.

* * * * *